United States Patent Office 3,351,532
Patented Nov. 7, 1967

3,351,532
SEED-BLANKET CONVERTER-RECYCLE
BREEDER REACTOR
Harry F. Raab, Jr., Pittsburgh, Milton J. Galper, McKeesport, and David H. Jones and George H. Conley, Pittsburgh, Pa., and William H. Hannum, Los Alamos, N. Mex., assignors, by mesne assignments, to the United States of America as represented by the United States Atomic Energy Commission
Filed Sept. 20, 1965, Ser. No. 488,487
9 Claims. (Cl. 176—17)

ABSTRACT OF THE DISCLOSURE

A thermal breeder neutronic reactor having uranium-233 fuel, a thorium-232 blanket and light water coolant with an average hydrogen to thorium-232 ratio of 0.4 to 1.5.

---

The present invention relates to heterogeneous neutronic reactors and more particularly to neutronic reactors of the seed-blanket type moderated and cooled by light water which increase the fissile fuel inventory (breed) over core lifetime while concurrently serving to produce power throughout core lifetime. This invention also relates to a seed-blanket heterogeneous neutronic reactor of the non-breeding type which includes a breeding region therein.

For purposes of this invention, a seed region comprises a region containing substantial quantities of a fissile material (i.e. a material which fissions upon capture of thermal neutrons) while the blanket region is fueled principally with a fertile material (i.e. a material which upon capture of neutrons is transmuted into a fissile material). A seed-blanket reactor of the "converter-burner" type is defined as a reactor wherein the fertile material is converted into fissile fuel material most of which is subsequently "burned" or fissioned in place in the reactor to produce useful power and to extend reactor lifetime. A "converter-recycle breeder" type of seed-blanket reactor is defined as a reactor wherein the fertile material is converted or transmuted to a fissile fuel material such that not only is sufficient fissile material produced to permit the burning of a portion of the fissile material in place in the reactor to produce useful power throughout core lifetime, but also there remains after a useful core life a sufficient quantity of fissile material which can be removed therefrom and reprocessed to comprise the fissile fuel of the seed of a subsequent reactor core. When this quantity of fissile material for reprocessing is equal to or greater than the quantity used to fuel the seed of the previous core, then the core has accomplished breeding.

Converter-recycle breeder reactors have been proposed in the past, however, the achievement of a practical converter-recycle breeder reactor which is moderated and cooled solely by light water has not been successful. In addition to utilize natural thorium ($Th^{232}$) as the fertile material, prior art arrangements have been faced with excessive parasitic neutron loss in protactinium-233 which is produced by conversion of $Th^{232}$ which acts to defeat the purposes of a breeding reactor.

It is an object of the present invention to provide a converter-recycle breeder reactor which is moderated and cooled by light water and which is characterized by the ability to produce realistic quantities of power throughout an extended core lifetime as well as to increase the fissile fuel inventory over core lifetime.

A further object of this invention is to provide a converter-recycle breeder reactor of the seed-blanket type which is moderated and cooled by light water.

A more specific object of this invention is to provide a converter-recycle breeder reactor of the seed-blanket type which is cooled and moderated by light water with the seed region fueled with uranium 233 and the blanket region fueled with thorium 232, the reactor being constructed to minimize parasitic neutron absorptions therein by protactinium 233.

A still further object of this invention is to provide a light water moderated and cooled converter-recycle reactor of the seed-blanket type with uranium 233 comprising the fissile seed material and thorium 232 comprising the fertile blanket material, the reactor being constructed such that the H to $U^{233}$ atom ratio of the seed, the seed volume, the average H to $Th^{232}$ atom ratio of the blanket, the $U^{233}$ to $Th^{232}$ ratio of the core, the core specific power and the core leakage each fall within predetermined limits to reduce parasitic neutron losses in the core and to produce realistic quantities of power throughout an extended core lifetime while concurrently increasing the fissile fuel inventory during core operation.

In accordance with the invention, a heterogeneous converter-recycle nuclear reactor of the seed-blanket type is cooled and moderated by light water. Fissile fuel comprising uranium-233 and a fertile fuel comprising thorium-232 are arranged in the core with the seed regions being fueled with a mixture of fissile and fertile fuel at the beginning of life and blanket regions containing only fertile fuel at the beginning of life. The fissile and fertile fuel concentrations and positions within the core are chosen to provide both an extended reactivity lifetime for the reactor core and an increase in the fissile fuel inventory of the reactor core over core lifetime (breeding). Fertile material is employed in the seed region to reduce parasitic neutron losses by lessening the competition for neutrons from parasitic material.

The reactor construction of this invention will operate for a lifetime of approximately 17,000 effective fuel power hours. After core shutdown, the core is removed and the fissile fuels extracted, reprocessed and then reinserted into the seed region of the next core of the reactor type.

It will be appreciated that the first seed used in the reactor contains predetermined quantities of $U^{233}$ and $Th^{232}$ with relatively small amounts of $U^{234}$, $U^{235}$ and $U^{236}$. As reactor cores are depleted and reprocessed (with the fissile content of one core being used to fuel the seed of the next core) presently known chemical means cannot separate the uranium isotopes occurring in the reprocessed fuel from each other. Thus each succeeding seed, while containing essentially the same quantity of fissile atoms (depending upon reprocessing losses), will not have the same isotopic makeup as the preceding seed. More specifically, each succeeding seed will have some of the uranium-233 atoms replaced by $U^{234}$ through $U^{236}$ atoms. This continues until equilibrium is reached, at which point the isotopic makeup of the uranium inventory remains constant for each succeeding seed. It is known that the breeding properties of $U^{233}$ substantially exceeds that of $U^{234}$, $U^{235}$ and $U^{236}$. Thus the breeding ability of the seeds containing an equilibrium mixture is less than that of those seeds prior to reaching equilibrium. Even though this equilibrium-composition seed does not have the breeding properties of pre-equilibrium seeds, it is still capable of producing useful power for reasonable reactivity lifetimes while not diminishing the core fissile fuel inventory. This fissile fuel inventory is used to fuel subsequent seeds for the reactor. With reactors constructed pursuant to this invention, equilibrium would occur after more than one hundred years of operation of the reactor plant. While each new seed is formed from reprocessed fissile fuel extracted from a prior reactor core, there would be provided a new blanket fueled only with thorium 232, some of which would comprise unused $Th^{232}$ from the previous blanket. Thus the only makeup fuel for both the seed and blanket would be sufficient thorium 232 to replace that which was converted on the previous cycle.

It has been determined that a reactor of the character described can be achieved by constructing a seed-blanket reactor having a plurality of seed regions or islands in the reactor core surrounded by blanket regions wherein reactivity control throughout core lifetime is achieved by moving fuel into and out of the core, thereby minimizing parasitic losses of neutrons to control materials. The seeds are constructed so that the initial atom ratio of hydrogen to uranium-233 therein lies between 30 and 120. The reactor core is sized so that the seed volume lies between 15 and 40% of the total core volume. In the blanket, the average atom ratio of hydrogen to thorium-232 is between 0.4 and 1.5. In the reactor core, the ratio of atoms of uranium 233 to thorium 232 lies between 0.005 and 0.10. In addition the core is formed with a specific power (the number of kilowatts of thermal energy produced per kilogram of initial fissile fuel) lying between 300 and 1500 kilowatts per kilogram (kw./kg.). The reactor core is constructed such that the leakage of core neutrons to the surroundings is less than 1% of the total neutrons produced in the core.

By choosing the hydrogen to fuel atomic ratio of the seed to produce a relatively "wet" seed and a relatively "dry" blanket, the number of neutrons produced from fission in the seed is maximized, and the number of fissile atoms produced in the blanket by the absorption of these neutrons is maximized. The losses to $Pa^{233}$ are directly proportional to the core specific power. The provision of a core arrangement having a relatively uniform power density throughout the core further serves to minimize losses to $Pa^{233}$ by maintaining low specific power density in the active region of the core. Minimization of neutron leakage from the core is achieved by surrounding the axial extremities of each of the seeds with a blanket region and by providing an additional thickness of blanket regions adjacent to the periphery of the core.

Further objects and advantages of the invention will become apparent as the following description proceeds and features of novelty which characterize the invention will be pointed out in particularity in the claims annexed to and forming a part of the specification.

For a better understanding of the invention reference may be had to the accompanying drawings in which.

BREEDING MECHANISM

Figure 1:
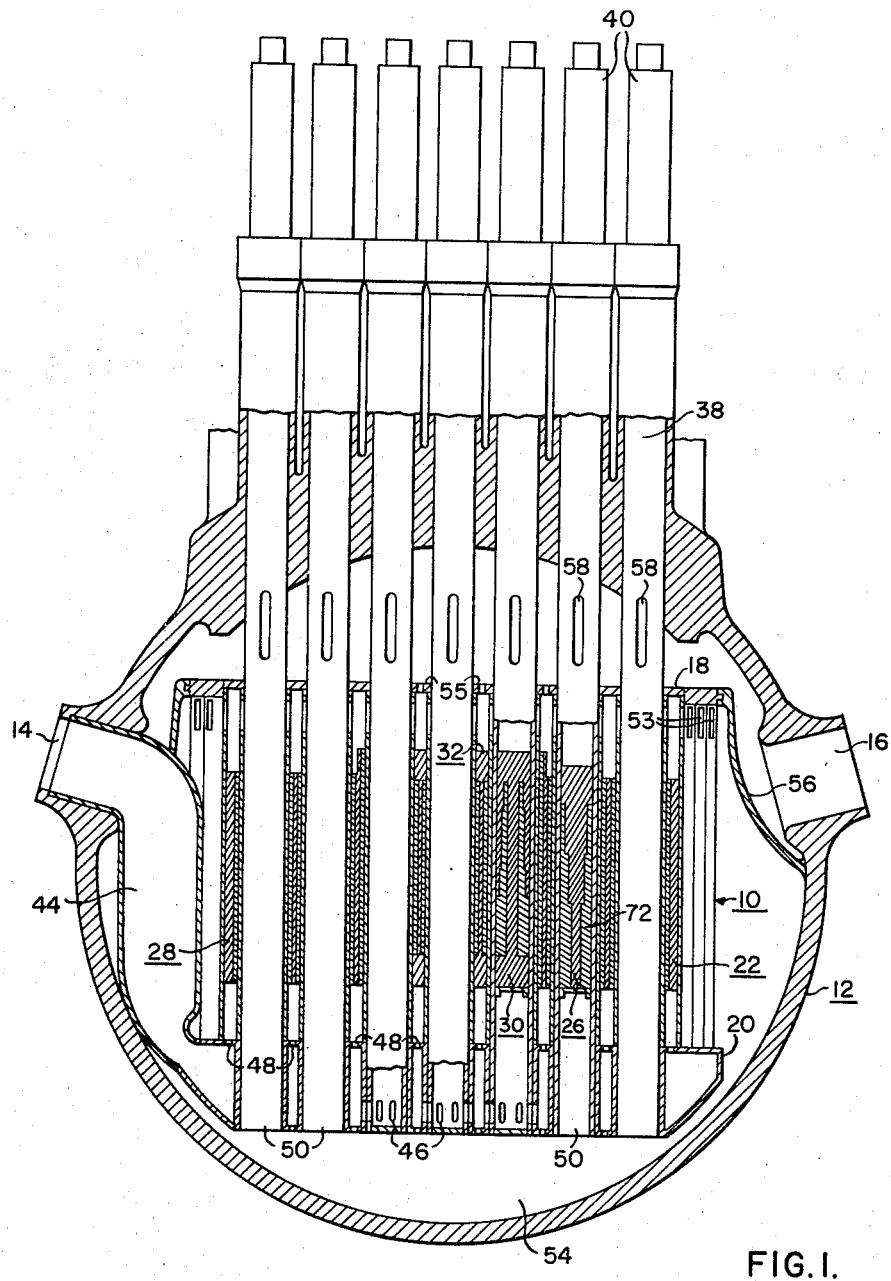
FIGURE 1 is a vertical, sectional view of a nuclear reactor constructed in accordance with this invention, and illustrating a converter-burner reactor having a converter-recycle breeder region in the center thereof.

Fissile fuel is produced in a breeding reactor by absorption of neutrons by the fertile thorium 232. $Th^{232}$ captures a neutron and becomes $Th^{233}$ which $\beta$ decays radioactively to protactinium 233 (half life 22.1 minutes). $Pa^{233}$ $\beta$ decays to fissile $U^{233}$ but at a relatively slow rate (half life approximately 27 days). Thus, a neutron captured in $Th^{232}$ results in the production of fissile $U^{233}$, provided the intermediate isotopes $Th^{233}$ and $Pa^{233}$ are not themselves destroyed by neutron capture. In view of the short life of $Th^{233}$ and its relatively small neutron capture cross-section, virtually all of the $Th^{233}$ decays to $Pa^{233}$. However, the neutron capture cross-section of $Pa^{233}$ is significant because for each neutron absorbed in $Pa^{233}$, two neutrons which would otherwise have produced $U^{233}$ are lost (one in producing the $Pa^{233}$ and one in destroying it). Also it is recognized that some $Pa^{233}$ will be transmuted to $Pa^{234}$ by neutron absorption and will then decay radioactively to fertile $U^{234}$, which can be transmuted to the fissile $U^{235}$ by neutron absorption. The neutron-producing properties of $U^{235}$ are not as great as $U^{233}$ particularly in moderated systems as will be explained hereinafter. Thus, it is essential to minimize the number of neutron absorptions by $Pa^{233}$.

In a reactor system, the chief source of neutrons is the fissioning of fissile fuel—in this case primarily $U^{233}$. This source of neutrons is augmented by a relatively small number (2–4%) of neutrons from the fast fissioning of non-fissile materials (i.e., $Th^{232}$, $Pa^{233}$, $U^{234}$ and $U^{236}$). Of the net number of neutrons produced per fissile atom destroyed, one neutron must be subsequently absorbed in fissile fuel to sustain the chain reaction and hence keep the reactor critical. Concurrently, at least one additional neutron must be absorbed in fertile material to replace the fissle atom destroyed if breeding is to be accomplished. Thus, a requirement for breeding is that the ratio of the neutron production from fission per neutron absorbed in fissile material be greater than 2.0. As is known in the art, $U^{233}$ is the only material wherein the ratio of neutron production per thermal neutron absorbed is significantly greater than 2.0 in a fuel-light water mixture. This ratio must be greater than 2.0 by a substantial amount to achieve breeding, since there are parasitic materials in any reactor configuration which will absorb neutrons.

It will be appreciated that $U^{233}$ is not available in nature in any substantial amounts and must be produced in a reactor to obtain a quantity sufficient to fuel the seeds of the instant reactor arrangements. A reactor arrangement can be constructed wherein the first seeds are formed from $U^{235}$, operated for a period of time to produce $U^{233}$ in the blanket region, and then the blanket reprocessed to obtain $U^{233}$ for use as a subsequent breeder seed fuel. The $U^{235}$ fueled reactor will not breed, i.e., more $U^{235}$ will be destroyed than $U^{233}$ produced. However, it does provide a means for generating $U^{233}$. This would be termed a pre-breeder or starter reactor.

CONVERTER-BURNER REACTOR HAVING A CONVERTER-RECYCLE BREEDER REGION

Figure 2:
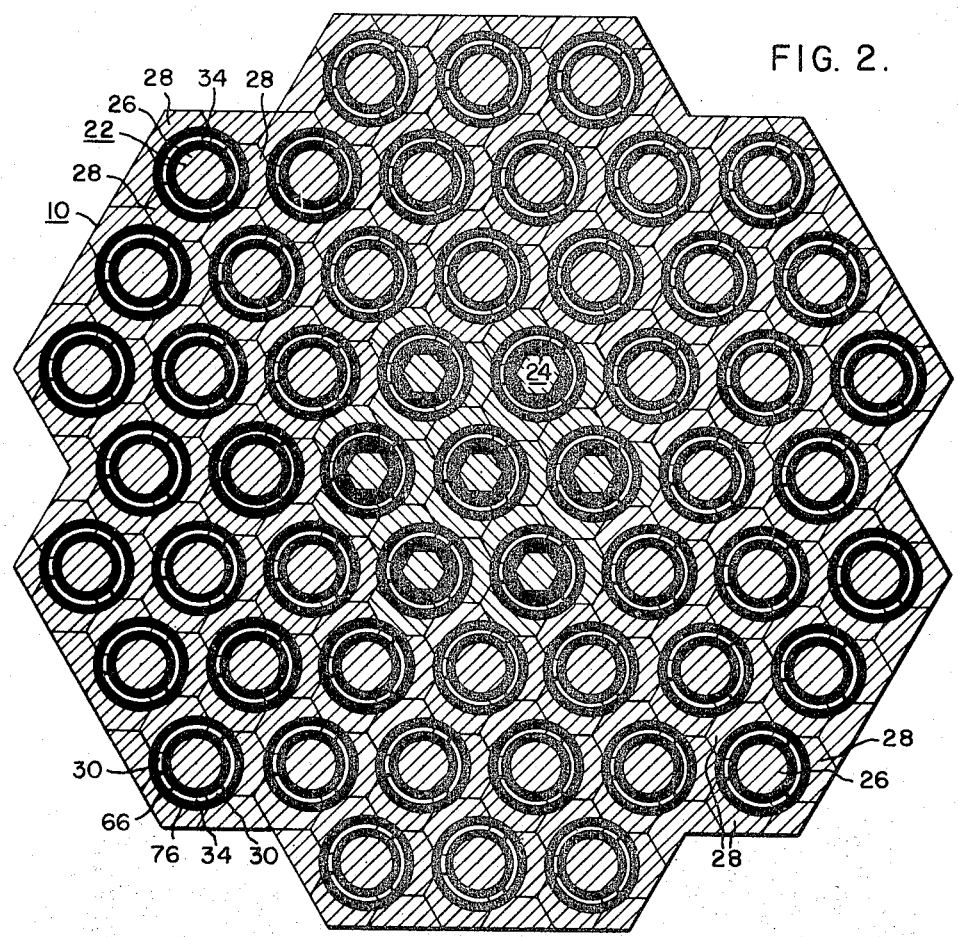
FIG. 2 is a schematic horizontal sectional view through the reactor core of FIG. 1.
Figure 3:
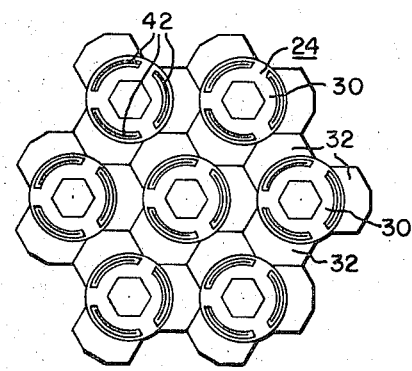
FIG. 3 is a diagrammatic horizontal view of the converter-recycle breeder region of the reactor core of FIG. 2.

Referring now to the reactor arrangement of FIGS. 1 through 7, and more particularly to FIGS. 1 to 3, there is illustrated a seed-blanket neutronic reactor embodying the principles of this invention wherein a converter-recycle breeder region is disposed centrally of and is surrounded by a converter-burner region. The purposes of this reactor arrangement is (1) to demonstrate the converter-recycle breeder reactor of this invention without constructing a complete converter-recycle breeder reactor, and (2) to provide a means for producing $U^{233}$ for a future converter-recycle breeder reactor by the starter concept as will be more fully explained. The reactor core, identified by the reference character 10 is positioned within a spherically-shaped pressure vessel 12 having an inlet flow nozzle 14 and an outlet flow nozzle 16 formed therein. The core 10 is fixedly positioned in vessel 12 between upper and lower core support plates 18 and 20 by suitable means. The core 10 is formed from an assemblage of fifty-five modules resulting in a generally hexagonal cross-section, forty-eight of the modules form the annular converter-burner portion of the reactor core and are identified by the reference character 22 while seven central modules form the converter-recycle portion of the core with each module being identified by the reference character 24. Each of the converter-burner modules 22 includes a central movable assembly 26 of cylindrical configuration and three chevron shaped stationary assemblies 28 surrounding the movable assembly 26. Similarly each module 24 of the central converter-recycle region of the reactor core includes a movable inner assembly 30 of generally circular cross-section and three chevron shaped stationary assemblies 32 positioned outwardly and surrounding the movable assemblies 30. Disposed intermediate the movable assembly and the stationary assemblies of each of the modules 22 and 24 is an annular support member 34 which forms three separate shutdown channels 36 by three radial spacing members 37 disposed between adjacent shutdown channels 36. A cylindrical shroud member 38 surrounds each of the movable assemblies 26 and 30 of modules 22 and 24 respectively and extends from the lower core support plate 20 through the upper core support plate 18 through openings in the head of pressure vessel 12 to the exterior thereof. A reactor control drive mechanism 40 is mounted on each of the shrouds 38 and serves to achieve individual axial movement relative to the core of both the shutdown rods 42 of each module 22 and 24 and the movable assemblies 26 and 30 thereof for achieving reactivity control of the reactor.

Coolant flow through core 10 is designed for two-pass flow through the converter burner fuel modules 22 and for single pass flow through the converter-recycle modules 24.

More particularly, moderator-coolant enters the pressure vessel 12 through the inlet nozzle 14 and flows downwardly through a flow guide 44 to the lower core support plate 20. Coolant flow through the converter-burner modules 22 passes upwardly through the stationary converter-burner assemblies 28 through openings 48. This flow is then diverted downwardly to lower plenum chamber 54 by upper support plate 18 and baffle means 56. From lower plenum 54 flow is conducted for its second pass through the movable converter-burner assemblies 26 through openings 50 in the lower ends of shrouds 38 and therefrom to the outlet nozzle 16 via openings 58 in shrouds 38. Concurrently, single pass flow through the converter-recycle modules 24 is conducted from the lower support plate 20 through the stationary converter-recycle fuel assemblies 28 to outlet nozzle 16 via openings 48 and 55 respectively in the core support plates 20 and 18. Openings 46 in shrouds 38 conduct coolant through movable converter-recycle assemblies 30 and therefrom to outlet 16 via openings 58.

CONVERTER-BURNER MODULES

Figure 4:
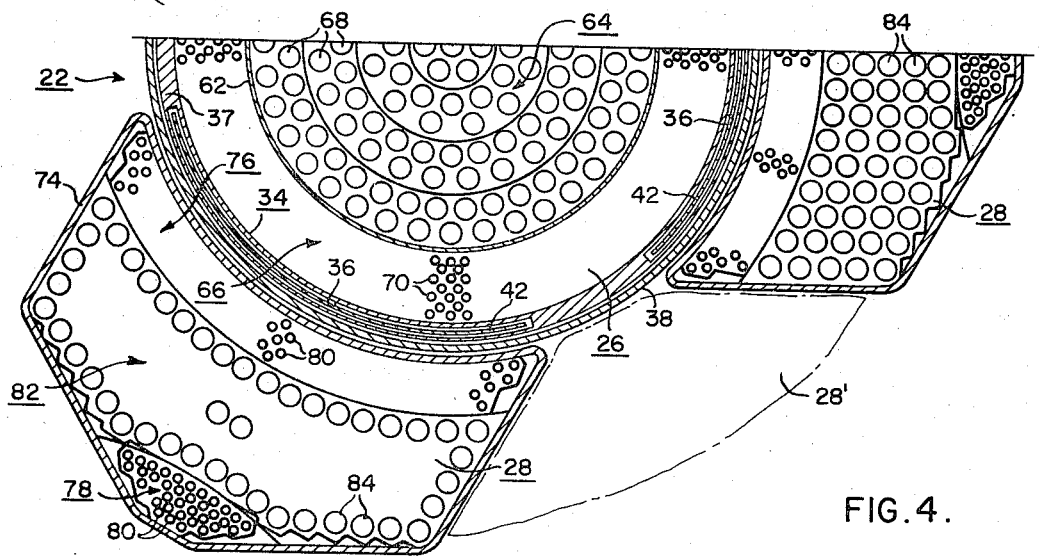
FIG. 4 is a horizontal sectional view through a portion of a single fuel module of the converter-burner portion of the reactor.

Referring now to FIG. 4, the movable fuel assembly 26 of each converter-burner module 22 is positioned within shroud 38 for axial movement into and out of the active region of reactor core 10. It will be appreciated that all structural members which extend into the core active region desirably are formed from a corrosion resistant material having a low neutron absorption cross-section, such as zirconium alloy. Three shutdown rods 42 formed from a neutron absorber poison, such as hafnium, surround each movable assembly 26 and are axially movable in channels 36 of support member 34 relative to assembly 26 independently of the position of the assembly 26. Disposed inwardly of the support plate 34 is a concentric circular support plate 62 which separates the central blanket region 64 of the assembly 26 from the annular seed region 66. The central blanket region 64 is formed by a plurality of axially extending rods or tubes 68 which extend the full length of the core active region and which desirably are formed from a corrosion resistant material having a relatively low neutron capture cross-section, for example from an alloy of zirconium. Each of the full length blanket fuel tubes 68 is capped at the ends thereof (not shown) and may contain for example a plurality of tandemly stacked pellets of fertile fuel material, for example thorium oxide. The cladding tubes 68 are fixedly positioned and axially spaced from one another by suitable means known in the art for example by spacing grids (not shown). The annular seed region 66 is formed similarly to the blanket region 64 and includes a plurality of full length cladding tubes 70 formed for example from an alloy of zirconium and containing the fissile material which for the converter-burner portion of the reactor comprises uranium 235. As illustrated by the shaded area of FIG. 1, the seed fuel of movable assembly 26 does not extend along the entire length of each of the cladding tubes 70. The cross-sectional array of fissile seed fuels is depicted by the reference character 72 of FIG. 1. Thus it will be appreciated that each of the cladding tubes 70 is partially filled with pellets of fissile fuel with the remainder being filled with pellets of fertile fuel. In this manner a generally wedge shaped seed of annular cross sectional configuration is formed in the annular region 66.

Each of the three chevron assemblies 28 for each converter-burner fuel module 22 is equidistantly spaced about the periphery of the shroud 38 to permit a chevron assembly 28' (FIG. 4) from the next adjacent module 22 to be nested between the adjacent ones of the chevron assemblies 28.

Each chevron assembly 28 includes an axially extending outer support 74 formed for example from an alloy of zirconium. Each of the stationary chevron assemblies 28 includes a pair of spaced seed regions 76 and 78 positioned respectively adjacent the inner and outer peripheries of the assembly 28 with each of the regions 76 and 78 containing a plurality of spaced full length cladding tubes 80 also formed for example from a zirconium alloy and each of the cladding tubes 80 including a plurality of pellets of fissile material (in this instance $U^{235}$) which extend the full length of the reactor core. Cladding tubes 80 desirably are capped and hermetically enclosed at the ends thereof (not shown). As seen in FIG. 2, seed regions 76 and 78 cooperate to form an annular seed completely surrounding each of the movable assemblies 26. Intermediate the seed regions 76 and 78 of the chevron assembly 28, there is provided a blanket region 82 which comprises a plurality of spaced cladding tubes 84 containing fertile material and formed similarly to the fuel elements 68 in blanket region 64.

Viewing FIG. 4, it will be appreciated that the diameter of the cladding tubes 70 and 80 of the seed regions are substantially smaller than the diameter of the cladding tubes 68 and 84 of the blanket regions. In this manner the metal-to-water ratio of the seed and blanket regions as well as the hydrogen to $U^{235}$ and hydrogen to $Th^{232}$ ratios of the seed and blanket regions have been suitably adjusted to obtain maximum core performance.

Physical and structural parameters of the converter-burner portion of the core 10 are given in Table I.

CONVERTER-RECYCLE BREEDER MODULES

Figure 5:
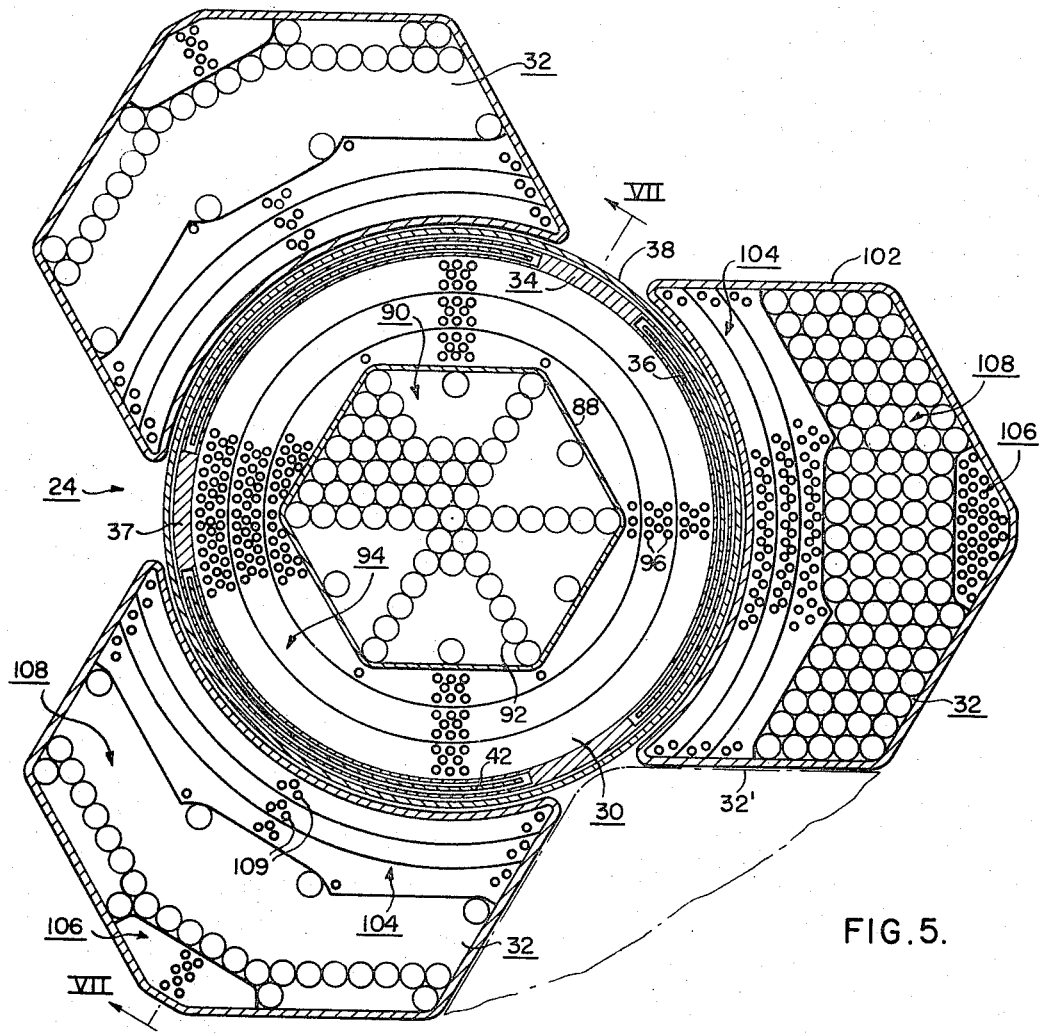
FIG. 5 is a view similar to FIG. 4 of a single converter-recycle breeder fuel module.
Figure 7:
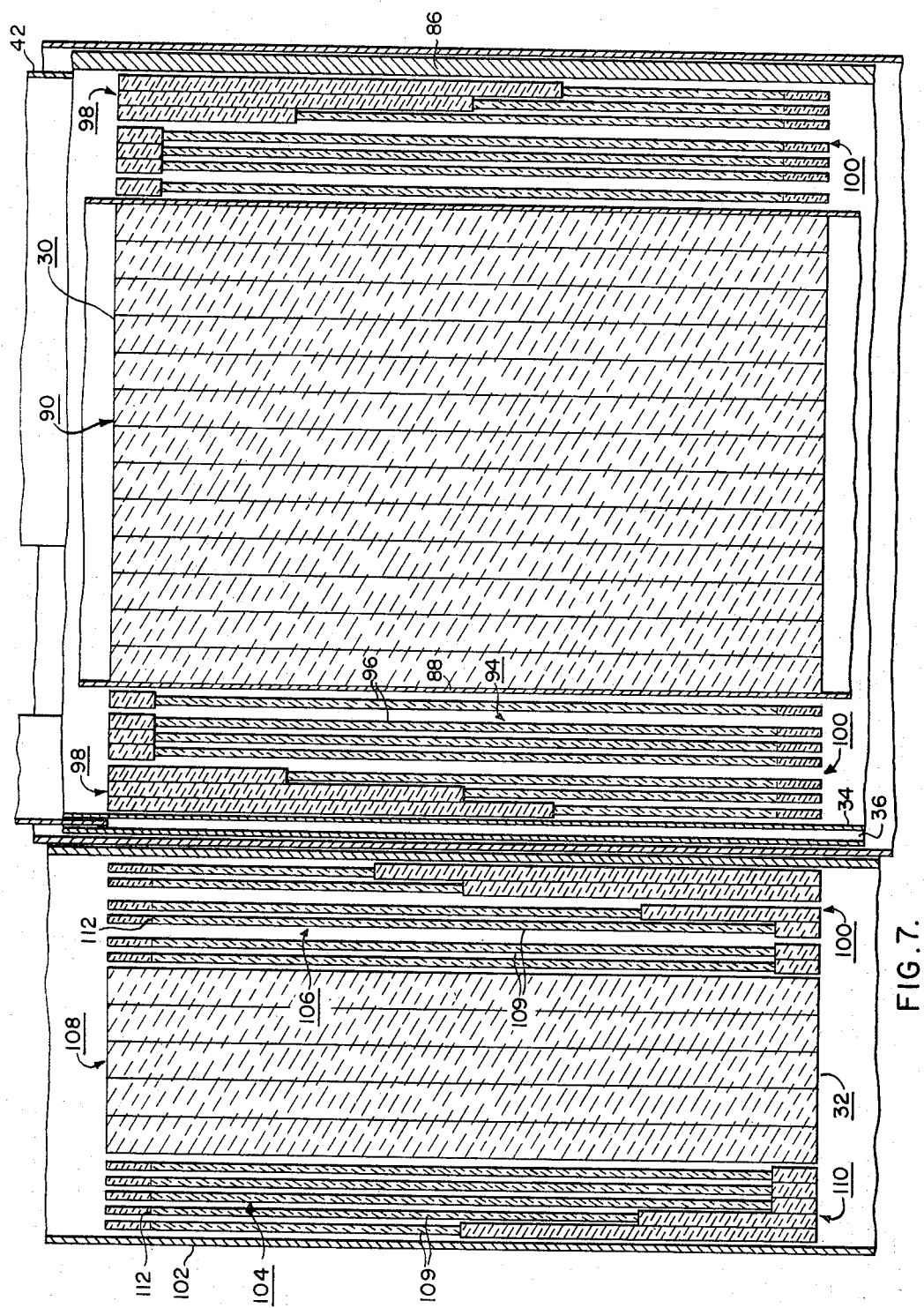
FIG. 7 is a vertical sectional view similar to FIG. 6 through the converter-recycle breeder fuel module of FIG. 5 and taken along the lines VII—VII thereof.

Each of the seven converter-recycle breeder modules 24 is provided with the movable core assembly 30 disposed for axial movement within shroud 38 and includes the tubular outer support plate 34 in which the control rod channels 36 are disposed. Each of the modules 24 includes three shutdown rods 42 formed from a suitable material such as hafnium positioned for movement within control rod channels 36, for independent movement relative to core 10 and relative to movable assemblies 30. As seen in FIGS. 5 and 7, a generally hexagonal support member 88 is disposed concentrically within the outer support 34 and contains therein a blanket region 90 of blanket fuel elements. Each of the fuel elements in the central blanket region 90 is formed similarly to the blanket fuel elements 68 previously described, however, it will be appreciated that the blanket region 90 is made to be extremely "dry." Thus, the hydrogen to thorium ratio of the blanket region 90 is substantially smaller than the equivalent ratios for the central blanket regions 64 of converter-burner modules 22. Disposed intermediate the support members 34 and 88 is a seed region 94. The seed region 94 comprises a plurality of clad fuel elements 96 such that the seed region is positioned centrally of and intermediate the ends of fuel elements 96. Fuel elements 96 in this instance include upper and lower blanket regions 98 and 100 (FIG. 7) extending respectively from above and below the seed fuel to the ends of elements 96. Each of the blanket regions 98 and 100 contain fertile material which serves to limit the leakage of neutrons produced by the seed fuel from the ends of the core 10. To form the blanket region 98 to be as dry as possible, each of the fuel rods 96 is formed to have a dual diameter, that is the diameter of the seed portion of rods 96 is smaller than the diameter of the blanket portion of rods 96. However from a mechanical design standpoint, it has been deemed desirable to have only one small diameter to large diameter transition in each of the rods 96. Thus, for structural reasons, the blanket region 100 disposed below the seed region 88 in this instance comprises a "wet" blanket region.

Figure 6:
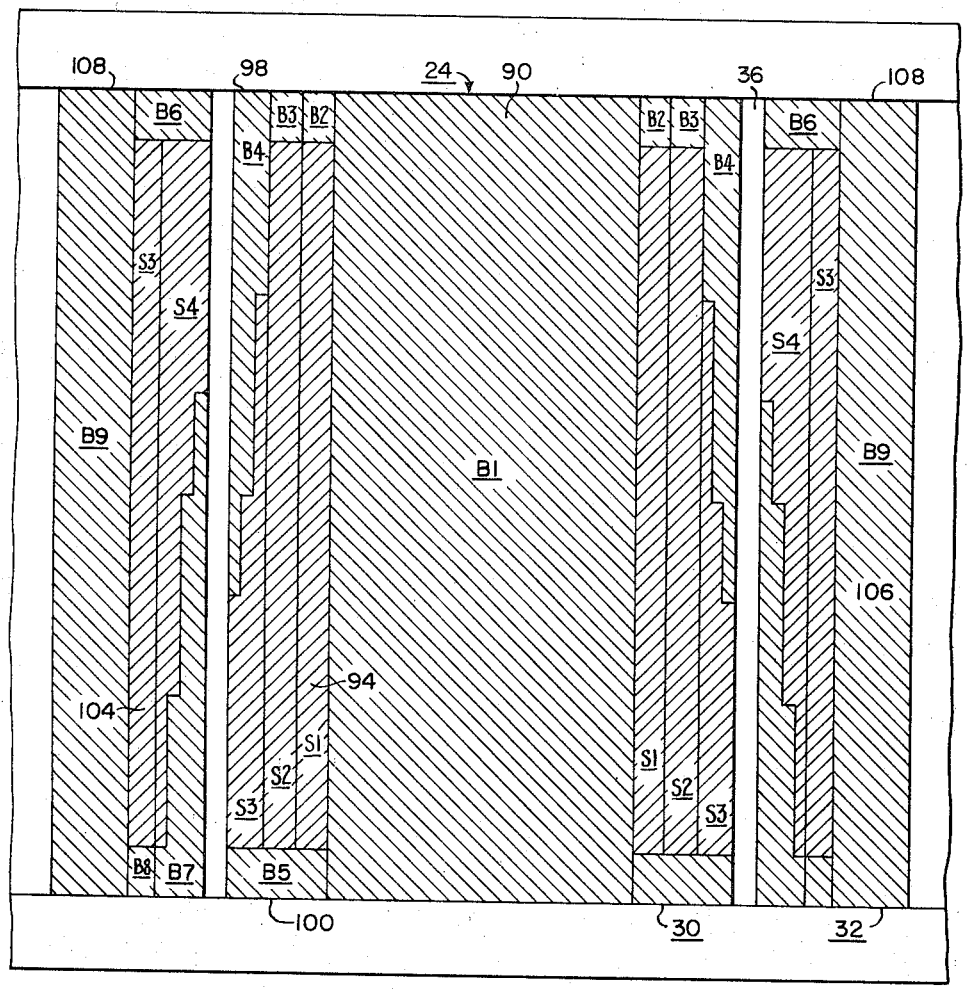
FIG. 6 is a schematic vertical section through one of the converter-recycle seeds and its adjacent blanket depicting certain fuel zones therein.

As can be seen from FIGS. 6 and 7, the seed 94 is formed of a wedge shaped arrangement with the seed regions receding from the adjacent shutdown rod channels 36. In this example the seed comprises a stepped configuration with the steps facing the upper end (FIG. 6) of core 10. The atomic ratios of all of the regions of the movable fuel assembly 30 are depicted in Table II with reference to the zones set forth in FIG. 6.

With reference to the chevron-shaped stationary assemblies 32 of the module 24, it will be appreciated that three chevron-shaped assemblies 32 are equidistantly spaced about the outer periphery of shroud 38 so that a chevron-shaped assembly of the next adjacent fuel module is nested between the adjacent ones of the assemblies 32 of a module 24, as depicted by the dotted lines 32' of FIG. 5. Each of the assemblies 32 includes an outer support member 102 which extends axially along the entire length of the core 10 and in which the fuel elements of the stationary assembly 32 are positioned. The assembly 32 is divided into a pair of seed regions 104 and 106 which extend axially therealong and are positioned adjacent to generally opposed sides of assembly 32. The remainder of the chevron assembly 32 is filled with a blanket region 108 such that when the reactor assemblies 24 are inserted into core 10, each of the movable modules 30 is surrounded by a generally annular stationary seed formed by nested seed regions 104 and 106 which in turn is surrounded by a concentric blanket formed by regions 108 of adjacent stationary assemblies 32. Each of the seed regions 104 and 106 is formed from a plurality of dual diameter fuel rods or elements 109 which are similar in form to the fuel rod 96. Thus each seed rod 109 is formed with one small diameter to large diameter step at a given axial position thereof. The dual diameter rods 109 provide a stepped seed configuration with steps facing downwardly (FIG. 7) in opposed relationship with the steps of the fuel elements 96. Accordingly, the large diameter segments of the fuel rods 109 are filled with blanket fuel material so as to provide a "dry" blanket region 110 of a stepped configuration adjacent the lower ends of the seed fuel tubes 109. The upper end of each of the fuel tubes 109 is also filled with blanket fuel material at positions above the line 112 in order to minimize neutron leakage from seeds 104 and 106 from the ends of seed region 106. The last-mentioned blanket region is referred to as region B6 in FIG' 6. It will be appreciated that the blanket region B6 comprises a relatively wet blanket region in order to preserve the mechanical rigidity of fuel tubes 109 through the formation of only one large diameter to small diameter tubing transition in each of the fuel tubes 109.

Referring to FIG. 6, it will be seen that the movable assembly 30 and fixed assemblies 32 have been divided into different zones such that exists nine blanket zones (B1 through B9) and five seed zones (S1 through S5) for each converter-recycle fuel module 24. The seed regions S1–S5 are fueled with a mixture of $U^{233}O_2$ and $ThO_2$ with the $U^{233}O_2$ comprising approximately 10 weight percent of the fuel. The isotopic compositions and mechanical arrangement of each of the above regions is set forth in Table II hereof.

Design parameters of one example of a reactor power plant constructed in accordance with the arrangement of FIGS. 1 through 7 the reactor nuclear design performance, the reactor core mechanical design, the reactor physics design and the fuel element design are described in the attached Table I.

TABLE I

Power plant:
Nominal thermal power _____mw__ 1790
Nominal gross electrical output (equivalent) _____mw__ 592
Net electrical output (equivalent) _mw__ 552.1
Turbine throttle pressure _____p.s.i.a__ 550
Full load turbine steam flow ____lb./hr__ 7,400,000
Number of loops _____ 4
Reactor inlet temperature _____° F__ 520
Reactor outlet temperature _____° F__ 564
Reactor core flow rate _____lbs./hr__ $112 \times 10^6$
Loop flow rate _____lbs./hr__ $28 \times 10^6$
Maximum fluid velocity (Th piping) _____ft./sec__ 34.8
Piping pressure loss _____p.s.i__ 21.2
Steam generator pressure loss ____p.s.i__ 32.7
Total system pressure loss _____p.s.i__ 102.9

Nuclear design performance:
Loading:
$U^{235}$, kg. _____ 4150
$U^{233}$, kg. _____ 356
$Th^{232}$, MT _____ 98
Reactivity lifetime, EFPH:
Converter burner portion _____ 70,000
Converter recycle breeder portion ____ 17,000

Type—Pressurized light water moderated and cooled, seed and blanket, reactivity control by moving fuel

| Reactor Core Mechanical Design | Converter Recycle Section | Converter Burner Section |
|---|---|---|
| Core height, fuel, in | 96 | 90 |
| Number Modules | 7 | 48 |
| Mean core diameter, ft | 5.81 | 16.3 |
| Fuel material: | | |
| Seed | $U^{233}O_2+ThO_2$ | $U^eO_2+ZrO_2$ $ThO_2$ |
| Blanket | $ThO_2$ | $ThO_2$ |
| Fuel cladding: | | |
| Seed | (1) | (1) |
| Blanket | (1) | (1) |
| Coolant flow passes | 1 | 2 |
| Core Thermal Hydraulic Design: | | |
| Total reactor heat output mw. (t) | 229 | 1561 |
| Total coolant flow rate, $10^6$ lb./hr | 14.4 | 97.6 |
| Total movable fuel flow rate, $10^6$ lb./hr | 6.55 | 46.5 |
| Blanket fuel flow rate, $10^6$ lb./hr | 0.50 | 9.3 |
| Seed fuel flow rate, $10^6$ lb./hr | 6.05 | 37.2 |
| Total stationary fuel flow rate, $10^6$ lb./hr | 7.6 | 45.13 |
| Seed | 5.1 | 45.1 |
| Blanket fuel (second pass) | 2.6 | 80.0 |
| Peripheral blanket | | 14.4 |
| Leakage and shutdown channel flow, $10^6$ lb./hr | 0.7 | 4.3 |
| Coolant inlet temp., ° F | 520 | 520 |
| Coolant exit temp., ° F | 563 | 565 |
| Average coolant temp., ° F | 544.5 | 542 |
| Primary system pressure, p.s.i.a | 2,000 | 2,000 |
| Heat flux, average: | | |
| Blanket, B.t.u./hr./ft.$^2$ | 46,000 | 80,000 |
| Seed, B.t.u./hr./ft.$^2$ | 211,000 | 298,000 |
| Heat flux, maximum: | | |
| Blanket, B.t.u./hr./ft.$^2$ | 185,000 | 377,000 |
| Seed, B.t.u./hr./ft.$^2$ | 600,000 | 845,000 |

[1] Zirconium Alloy.
$U^e$—means highly enriched uranium.

to $U^{233}$. By removing water from the seed, $\eta$ is reduced, but this may be compensated by the reduction of parasitic neutron losses to the water.

A high atom ratio of hydrogen to $U^{233}$ may imply a low uranium $U^{233}$ content, however, this must be balanced against the lifetime requirement. A higher loading may reduce the atom ratio of hydrogen to $U^{233}$ and hence lower $n$, but will also reduce the specific power and reduce $Pa^{233}$ losses which tends to compensate therefore. To reduce the leakage of neutrons from the reactor core, it is implied in this invention that the size of the core must be large. Thus, it will be appreciated that a reactor core on the order of 15 feet in diameter is desirable.

Pre-breeder or starter arrangement

It is contemplated by this invention that uranium-233 for use in a converter recycle breeder reactor can be produced in the converter recycle breeder region of the reactor of FIGURES 1–7. To accomplish this the seed regions of the converter recycle breeder modules 24, as described in detail above, would be fueled with approximately 380 kg. of $U^{235}$ in a mixture of $U^{235}O_2$ and $ZrO_2$ of approximately 30 w/o $U^{235}O_2$. The seed fuel elements of the first core of the converter recycle breeder modules would be fueled with the $U^{235}$ bearing composition described above; the reactor operated through its useful lifetime, and the blanket fuel reprocessed to obtain $U^{233}$ for use in a converter recycle breeder reactor. The process would be repeated until sufficient $U^{233}$ was generated.

Of course, the entire core 10 could be fabricated from converter recycle breeder modules 24 containing $U^{235}$ fueled seeds to produce sufficient $U^{233}$ therein during one core lifetime for a large converter recycle breeder reactor.

Converter-recycle reactor

Figure 8:
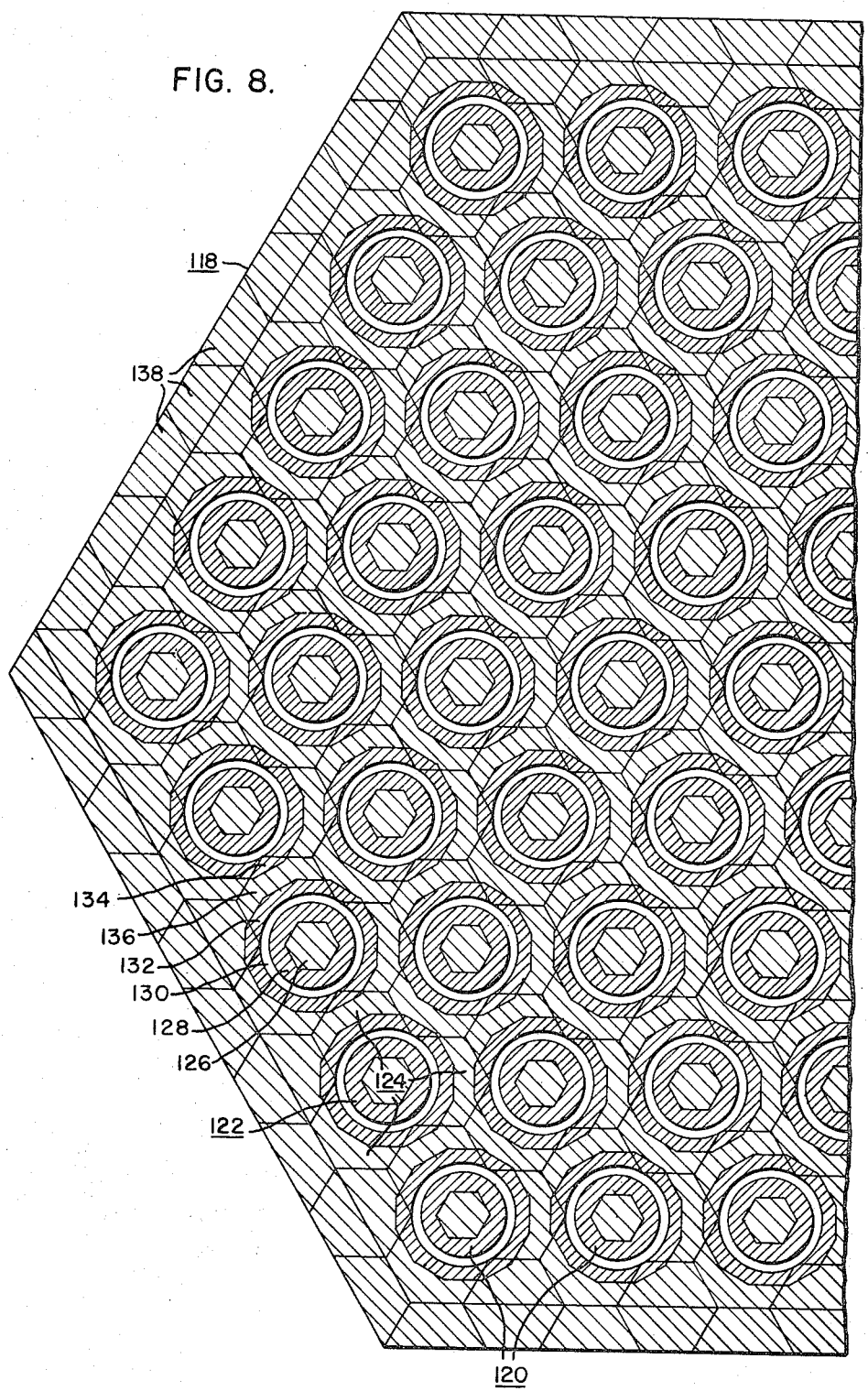
FIG. 8 is a schematic horizontal sectional view through a converter-recycle breeder reactor core constructed in accordance with the principles of this invention.

Referring now to the reactor core arrangement of FIG. 8, there is illustrated a cross-section through approximately ½ of a reactor core containing solely converter-recycle fuel modules 120. Each module 120 includes a central movable seed-blanket portion 122 and three chevron-shaped fixed seed-blanket regions 124. Each of the movable regions 122 is formed similar to the movable region 30 of FIGS. 1 through 7 and each of the fixed fuel assemblies 124 is formed similar to the fixed assemblies 32 of FIGS. 1 through 7. Thus, the movable assembly 122 has a relatively dry central blanket region 126 of hexagonal cross-section surrounded by a stepped seed-stepped blanket composite region 128. A coolant-moderate channel 130 surrounds the movable assembly 122 and in this arrangement there is no provision for shutdown rods. Fuel control for the instant design is obtained solely by movement into and out of the core of the movable fuel assemblies 122. Each of the stationary chevron-assemblies includes a pair of spaced seed-blanket composite regions 132 and 134 of stepped cnfiguration which have positioned therebetween a blanket region 136 with the regions 132, 134 and 136 conforming generally to the regions 106, 104 and 108, respectively of chevron assemblies 32.

Surrounding the outer periphery of the reactor core 118 there is an array of blanket chevron assemblies 138 which are formed solely from blanket fuel rods in the same manner as blanket regions 126 and 136. The assemblies 138 are disposed about the periphery to reduce the neutron leakage about the periphery of core 118. More particularly the assemblies 138 are disposed to provide a blanket region of approximately seven inches thick surrounding the core periphery.

It will be appreciated that the reactor core 118 is formed from sixty-one modules 120 of the same size and shape as the converter-recycle breeder modules 24 of FIGS. 1 through 6 with the core 118 differing from the converter-recycle breeder portion of core 10 in the following respects:

(1) No shutdown rods are used in channels 130, and the channels may be reduced to that size required for clearance. This in turn allows more fuel rods to be inserted in the seed, and reduces parasitic neutron losses in coolant and structure.

(2) A total of sixty-one modules 120 are used and result in a hexagonal cross-section for core 118, and (3) A seven inch layer of peripheral blanket formed by chevron-assemblies 138 surrounds the circumference of core 118.

In substantially all other ways, core 118 conforms to the converter-recycle breeder region of core 10. Thus, the hydrogen to $U^{233}$ atom ratio in the seed, the seed volume, the average hydrogen to $Th^{232}$ atom ratio in the blanket, the $U^{233}$ to $Th^{232}$ atom ratio in the core, the core specific power, and the core leakage are formed to lie within the ranges set forth in connection with the converter-recycle breeder portion of core 10.

It will be appreciated that many modifications and variations may be made in the embodiments of the invention illustrated in detail herein without departing from the broad spirit and scope of this invention. Accordingly, it is specifically intended that the embodiments of this invention described herein be interpreted as illustrative of the invention rather than as limited thereof.

What is claimed is:

1. In a neutronic reactor of the converter-recycle breeder type which contains more fissile material at the end of useful core lifetime than the initial core loading of fissile material, a reactor core having a plurality of spaced seed regions and a blanket region completely surrounding each of said seed regions, each of the seed regions extending axially between the ends of the reactor core, and a blanket section positioned intermediate each of the ends of each seed region and the corresponding end of the reactor core, said seed regions being fueled with $U^{233}$ and said blanket region being fueled with $Th^{232}$, said reactor core being moderated and cooled by light water, means for reducing the absorption of neutrons by $Pa^{233}$ and for minimizing the parasitic losses of neutrons in said core, said means comprising means for moving portions of said seeds and said blanket out of said core to control the reactivity of said core, whereby parasitic losses of neutrons to control poisons are eliminated, said seeds having a H to $U^{233}$ atom ratio therein of from 30 to 120, said seed having a volume fraction in said core lying between 15 and 40% of the total core volume, said blanket being formed with an average H to $Th^{232}$ atom ratio of between 0.4 and 1.5, said core being fueled with an atom ratio of $U^{233}$ to $Th^{232}$ lying between 0.005 and 0.1 and a specific power lying between 300 and 1500 kw./kg., said reactor core being arranged to prevent neutron leakage therefrom of an amount greater than 1% of the total neutrons produced in the core whereby said core operates at a substantially uniform power density and whereby said reactor contains a larger fissile fuel inventory at the end of life than its initial inventory and whereby said reactor is operated such that equilibrium fuel concentrations do not occur for approximately 100 years.

2. The neutronic reactor of claim 1 wherein each of the seed regions is of generally annular configuration having a central opening therein and wherein each of the central openings is fueled with blanket fuel material.

3. The neutronic reactor of claim 1 wherein each of the seed regions is of generally annular configuration having a central opening therein and wherein each of the central openings is fueled with blanket fuel material.

4. The neutronic reactor of claim 1 wherein one blanket section intermediate one end of each of said seeds and the adjacent end of the reactor core has a substantially higher hydrogen to fertile fuel atom ratio than the remainder of the blanket regions of said reactor core.

5. The neutronic reactor of claim 4 wherein the seed region is formed by a plurality of spaced axially extending fuel containing tubes and wherein each of the fuel tubes has a small diameter portion extending axially therealong and joined to a larger diameter portion ex-

| Fuel Elements | Converter-Recycle Section | | | | Converter-Burner Section | | | |
|---|---|---|---|---|---|---|---|---|
| | Movable Fuel | | Stationary Fuel | | Movable Fuel | | Stationary Fuel | |
| | Blanket | Seed | Seed | Blanket | Blanket | Seed | Seed | Blanket |
| Rod length, in | 106 | 106 | 106 | 106 | 100 | 100 | 100 | 100 |
| Total heat transfer surface per module, ft.²: | | | | | | | | |
| Seed | | 224.2 | 280.3 | | | 341.9 | 405.7 | |
| Blanket | | | | | 95.2 | | | 492.3 |
| 0.250 dia. rod | | 31.1 | 41.2 | | | | | |
| 0.330 dia. rods | | 56.8 | 97.9 | | | | | |
| 0.738 dia. rods | 131.3 | | | 690.9 | | | | |
| Fuel rod diameter: | | | | | | | | |
| Seed | | 0.25 | 0.25 | | | 0.280 | 0.280 | |
| Blanket | 0.738 | 0.25 | 0.25 | 0.738 | 0.674 | | | 0.674 |
| Transition rod | | 0.330 | 0.330 | | | | | |
| Rods per module | 85 | 664 | 756 | 447 | 72 | 622 | 738 | 372 |
| Clad thickness, in | 0.039 | 0.014/0.019 | 0.014/0.019 | 0.039 | 0.038 | 0.018 | 0.018 | 0.038 |
| Distance between spacer: | | | | | | | | |
| Supports, in., number | 6 | 20 | 20 | 6 | 48 | 24 | 24 | 48 |
| Supports per rod | 16 | 5 | 5 | 16 | 3 | 5 | 5 | 3 |
| Feed of rod per module: | | | | | | | | |
| Seed | | 3426 | 4234 | | | 5183 | 6150 | |
| Blanket | | | | | 600 | | | 3100 |
| 0.250 dia | | 476 | 630 | | | | | |
| 0.330 dia | | 658 | 1134 | | | | | |
| 0.738 dia | 680 | | | 3576 | | | | |
| Nominal coolant velocity in fuel region, ft./sec.: | | | | | | | | |
| Seed | | 14.4 | 11.5 | | | 14.6 | 15.9 | |
| Blanket | | | | | 7.8 | | | 12.6 |
| 0.250 dia | | 14.4 | 11.5 | | | | | |
| 0.330 dia | | 28.8 | 28.8 | | | | | |
| 0.738 dia | 8.5 | | | 11.8 | | | | |
| Fuel element and orifice pressure drop at full flow, p.s.i | 18.7 | 18.7 | 18.7 | 17.0 | 17.0 | 17.0 | 17.0 | 6.0 |
| Metal-to-water ratio | 6.74 | 0.633 | 0.633 | 6.74 | 1.248 | 0.874 | 0.935 | 1.149 |
| Hydraulic diameter, in | 0.108 | 0.350 | 0.323 | 0.108 | 0.466 | 0.286 | 0.259 | 0.512 |

TABLE II.—CONVERTER-RECYCLE CORE, MATERIALS COMPOSITIONS

[Blanket initial atom densities ($\times 10^{-24}$cm.$^{-3}$)]

| Material | Region B1 | Region B2 | Region B3 | Region B4 | Region B5 | Region B6 | Region B7 | Region B8 | Region B9 |
|---|---|---|---|---|---|---|---|---|---|
| Hydrogen | 0.007803 | 0.01749 | 0.01550 | 0.01321 | 0.02913 | 0.02843 | 0.01496 | 0.01648 | 0.009236 |
| Oxygen | 0.03291 | 0.02947 | 0.03057 | 0.03025 | 0.02702 | 0.02568 | 0.02818 | 0.02877 | 0.03156 |
| Zirconium Alloy | 0.006900 | 0.006990 | 0.006552 | 0.007669 | 0.005350 | 0.006978 | 0.009238 | 0.008059 | 0.007790 |
| Thorium-232 | 0.01451 | 0.01036 | 0.01141 | 0.01182 | 0.006227 | 0.005730 | 0.01033 | 0.01026 | 0.01347 |

[Seed initial atom densities ($\times 10^{-24}$cm.$^{-3}$)]

| Material | Region S1 | Region S2 | Region S3 | Region S4 | Region S5 |
|---|---|---|---|---|---|
| Hydrogen | 0.03029 | 0.02959 | 0.02821 | 0.02818 | 0.02916 |
| Oxygen | 0.02603 | 0.02679 | 0.02662 | 0.02530 | 0.02537 |
| Zirconium Alloy | 0.005454 | 0.004860 | 0.005479 | 0.006920 | 0.006537 |
| Thorium-232 | 0.004960 | 0.005461 | 0.005700 | 0.005107 | 0.006537 |
| Uranium-233 | 0.0004697 | 0.0005172 | 0.0005399 | 0.0004837 | 0.004914 |
| Uranium-234 | 0.0001409 | 0.0001552 | 0.00001620 | 0.00001451 | 0.0004654 |
| Uranium-235 | 0.00000122 | 0.00000135 | 0.00000141 | 0.00000126 | 0.00001396 |

[Reflector and shutdown rod channel number densities ($\times 10^{-24}$cm.$^{-3}$)]

| Material | Shutdown Rod Channel (34) | Reflector |
|---|---|---|
| Hydrogen | 0.03003 | 0.05037 |
| Oxygen | 0.01501 | 0.02519 |
| Zirconium Alloy | 0.01747 | 0 |

To construct a converter-recycle breeder reactor which is cooled by and moderated by light water and which has a realistic core lifetime and a realistic power production capability, it is necessary to provide a plurality of spaced seeds or seed islands throughout the reactor core. The parasitic losses of neutrons in the core must be kept as low as possible. In addition, the atom ratio of hydrogen to $U^{233}$ in the seed should lie between 30 and 120. The seed volume fraction in the core should lie between 15 and 40% of the total core volume. The atom ratio of uranium $U^{233}$ to thorium $Th^{232}$ in the core should lie between 0.005 and 0.10. The specific power of the core should be between 300 and 1500 kw./kg. The average atom ratio of hydrogen to $Th^{232}$ in the blanket (i.e., the average H to Th ratio in regions B1 through B9) should lie between 0.4 and 1.5 and the reactor core is designed such that the neutron leakage is less than 1% of the total neutrons produced therein.

In choosing different ones of the above parameters it must be appreciated that the selection of a given fuel loading and a given seed volume fraction will influence both the atom ratio of hydrogen to $U^{233}$ in the seed and the atom ratio of $U^{233}$ to $Th^{232}$ in the entire core. The selection of an average H to $Th^{232}$ atom ratio in the blanket and a seed volume fraction will influence the $U^{233}$ to $Th^{232}$ atom ratio in the core.

The specific power of the core (kw./kg.) affects the $Pa^{233}$ losses; i.e., a lower value of specific power lowers $Pa^{233}$ losses and helps improve breeding. If the parasitic losses can be reduced further by some other means, higher values of specific power can be tolerated. In the instant reactor arrangement, it will be appreciated that parasitic losses to control rods are reduced through the use of movable fuel control and parasitic (in this case, neutron leakage) losses from the ends of the seed fuel elements are reduced by the provision of axially spaced blanket regions adjacent each end of each seed fuel element.

In the seed, it is desired to achieve as high a seed $\eta$ as possible (neutrons produced per neutron absorbed in fissile material). This implies a high atom ratio of hydrogen tending for the remainder of the axial dimension of each of said tubes and wherein the small diameter portion of each fuel tube extends only through said one blanket section.

6. The neutronic reactor of claim 3 wherein each of the annular seeds includes a concentric annular stationary seed section and a movable seed section surrounded by said stationary seed section, said core having blanket fuel material positioned along axial segments of those portions of said stationary and movable seed sections which are positioned adjacent the boundary between said stationary and movable seed sections.

7. The neutronic reactor of claim 1 wherein the seed regions are fueled with a mixture of fissile $U^{233}$ and fertile $Th^{232}$.

8. The neutronic reactor of claim 1 wherein the reactor core includes an axial and a radial dimension wherein an additional blanket region surrounds the entire radial extremity of said reactor core, whereby neutron leakage from said reactor core about said radial extremity is reduced.

9. The converter-recycle neutronic reactor of claim 1 wherein the seed region is fueled substantially entirely with $U^{235}$.

References Cited
UNITED STATES PATENTS

| | | | |
|---|---|---|---|
| 3,151,029 | 9/1964 | Schwoerer | 176—17 |
| 3,154,471 | 10/1964 | Radkowsky | 176—17 |
| 3,219,535 | 11/1965 | Robbins | 176—17 |
| 3,252,867 | 5/1966 | Conley | 176—18 |

CARL D. QUARFORTH, *Primary Examiner.*

L. DEWAYNE RUTLEDGE, *Examiner.*

H. E. BEHREND, *Assistant Examiner.*